US008477457B2

(12) United States Patent
Matsumoto et al.

(10) Patent No.: US 8,477,457 B2
(45) Date of Patent: Jul. 2, 2013

(54) HEAD-GIMBAL ASSEMBLY WITH A SUSPENSION-LEAD PAD HAVING A FORM THAT IS CONFIGURED TO INHIBIT FORMATION OF AN INTER-PAD SOLDER BRIDGE

(75) Inventors: Yuhsuke Matsumoto, Kanagawa (JP); Tatsumi Tsuchiya, Kanagawa (JP); Eiki Oosawa, Kanagawa (JP); Tatsushi Yoshida, Kanagawa (JP)

(73) Assignee: HGST Netherlands, B.V., Amsterdam (NL)

( * ) Notice: Subject to any disclaimer, the term of this patent is extended or adjusted under 35 U.S.C. 154(b) by 11 days.

(21) Appl. No.: 13/229,631

(22) Filed: Sep. 9, 2011

(65) Prior Publication Data

US 2013/0063839 A1    Mar. 14, 2013

(51) Int. Cl.
*G11B 5/54* (2006.01)
*G11B 5/60* (2006.01)

(52) U.S. Cl.
USPC ...................................... 360/234.5

(58) Field of Classification Search
USPC ........... 360/234.5, 234.3, 234.6, 235.7, 236.5
See application file for complete search history.

(56) References Cited

U.S. PATENT DOCUMENTS

| 6,459,549 | B1 | 10/2002 | Tsuchiya et al. | |
|---|---|---|---|---|
| 6,700,746 | B1 | 3/2004 | Branat et al. | |
| 7,168,154 | B2 * | 1/2007 | Tsuchiya et al. | 29/603.06 |
| 7,205,661 | B2 * | 4/2007 | Wark et al. | 257/737 |
| 7,486,480 | B2 | 2/2009 | Satoh et al. | |
| 8,213,121 | B2 * | 7/2012 | Dela Pena et al. | 360/234.5 |
| 8,259,415 | B2 * | 9/2012 | Hutchinson et al. | 360/234.5 |
| 2005/0199680 | A1 * | 9/2005 | Matsumoto et al. | 228/101 |
| 2006/0139809 | A1 * | 6/2006 | Matsumoto et al. | 360/234.5 |
| 2006/0193084 | A1 * | 8/2006 | Satoh et al. | 360/234.5 |
| 2007/0047144 | A1 * | 3/2007 | Oosawa | 360/234.5 |
| 2008/0062565 | A1 * | 3/2008 | Umezaki et al. | 360/234.3 |
| 2008/0088975 | A1 * | 4/2008 | Bennin et al. | 360/234.5 |
| 2008/0180856 | A1 | 7/2008 | Hirano et al. | |
| 2008/0247082 | A1 | 10/2008 | Kavosh et al. | |
| 2009/0091860 | A1 | 4/2009 | Dela Pena et al. | |
| 2010/0020446 | A1 | 1/2010 | Dunn et al. | |
| 2010/0321829 | A1 | 12/2010 | Hutchinson | |
| 2011/0310512 | A1 * | 12/2011 | Hasegawa et al. | 360/245.3 |
| 2013/0033785 | A1 * | 2/2013 | Feng et al. | 360/234.5 |

* cited by examiner

Primary Examiner — Jefferson Evans

(57) ABSTRACT

A head-gimbal assembly (HGA) with a suspension-lead pad having a form that is configured to inhibit formation of an inter-pad solder bridge. The HGA includes a gimbal, a head-slider and a plurality of suspension-lead pads. The head-slider is coupled with the gimbal, and includes a plurality of head-slider pads. The plurality of suspension-lead pads is coupled with the plurality of head-slider pads by a plurality of solder bonds. A suspension-lead pad comprises a first lateral side, a second lateral side, a proximal side, disposed in proximity to a respective head-slider pad, and a distal side. A first width of the suspension-lead pad closer to the proximal side is substantially larger than a second width of the suspension-lead pad further from the proximal side than the first width. A disk drive including the HGA, and a head-slider with a head-slider pad having similar form to the suspension-lead pad are also provided.

22 Claims, 10 Drawing Sheets

HEAD-GIMBAL ASSEMBLY WITH A SUSPENSION-LEAD PAD HAVING A FORM THAT IS CONFIGURED TO INHIBIT FORMATION OF AN INTER-PAD SOLDER BRIDGE

TECHNICAL FIELD

Embodiments of the present invention relate generally to the field of hard-disk drives (HDDs), and in particular to head-gimbal assemblies (HGAs) for HDDs.

BACKGROUND

With the advance of HDD technology, the spacing between a magnetic-recording head and a magnetic-recording disk has become progressively smaller, on the order of a few nanometers (nm) to attain higher levels of areal density (AD) of stored information. Various new techniques have been incorporated into design of the magnetic-recording head to achieve such molecular scale spacing. For example, thermal-fly-height control (TFC) incorporates a heater than adjusts the fly-height (FH) of the magnetic-recording head to attain nanometer-scale spacing. TFC requires that additional input pads be provided to the magnetic-recording head to provide power for the TFC heater element. Moreover, thermally assisted magnetic recording (TMR), another technique for increasing the AD of stored information, may also require the incorporation of a laser heating element into the magnetic-recording head, which would again require additional input pads to provide power for the laser heating element. At the same time the size of magnetic recording heads, themselves, has become progressively smaller in order to lower the manufacturing costs for magnetic-recording-head fabrication through batch processing. Consequently, magnetic recording heads for high AD magnetic recording include greater numbers of input-power pads at the trailing edge of the magnetic-recording head, where such input power pads are located. Thus, engineers and scientists engaged in the development of HDDs are becoming increasingly more interested in developing methods for providing power to multiple inputs of the magnetic-recording head for high AD recording at reduced cost, but yet maintaining high reliability.

SUMMARY

Embodiments of the present invention include a head-gimbal assembly (HGA) with a suspension-lead pad having a form that is configured to inhibit formation of an inter-pad solder bridge. The HGA includes a gimbal, a head-slider and a plurality of suspension-lead pads. The head-slider is coupled with the gimbal, and includes a plurality of head-slider pads. The plurality of suspension-lead pads is coupled with the plurality of head-slider pads by a plurality of solder bonds. A suspension-lead pad includes a first lateral side, a second lateral side, a proximal side, disposed in proximity to a respective head-slider pad, and a distal side, disposed distally from the respective head-slider pad. A first width of the suspension-lead pad closer to the proximal side is substantially larger than a second width of the suspension-lead pad further from the proximal side than the first width. Embodiments of the present invention also include a disk drive including the HGA with the suspension-lead pad, and the head-slider with a head-slider pad. Also, both the head-slider pad and the suspension-lead pad of the HGA in the HDD have a form that is configured to inhibit formation of an inter-pad solder bridge.

DESCRIPTION OF THE DRAWINGS

The accompanying drawings, which are incorporated in and form a part of this specification, illustrate embodiments of the invention and, together with the description, serve to explain the embodiments of the invention.

Figure 1:
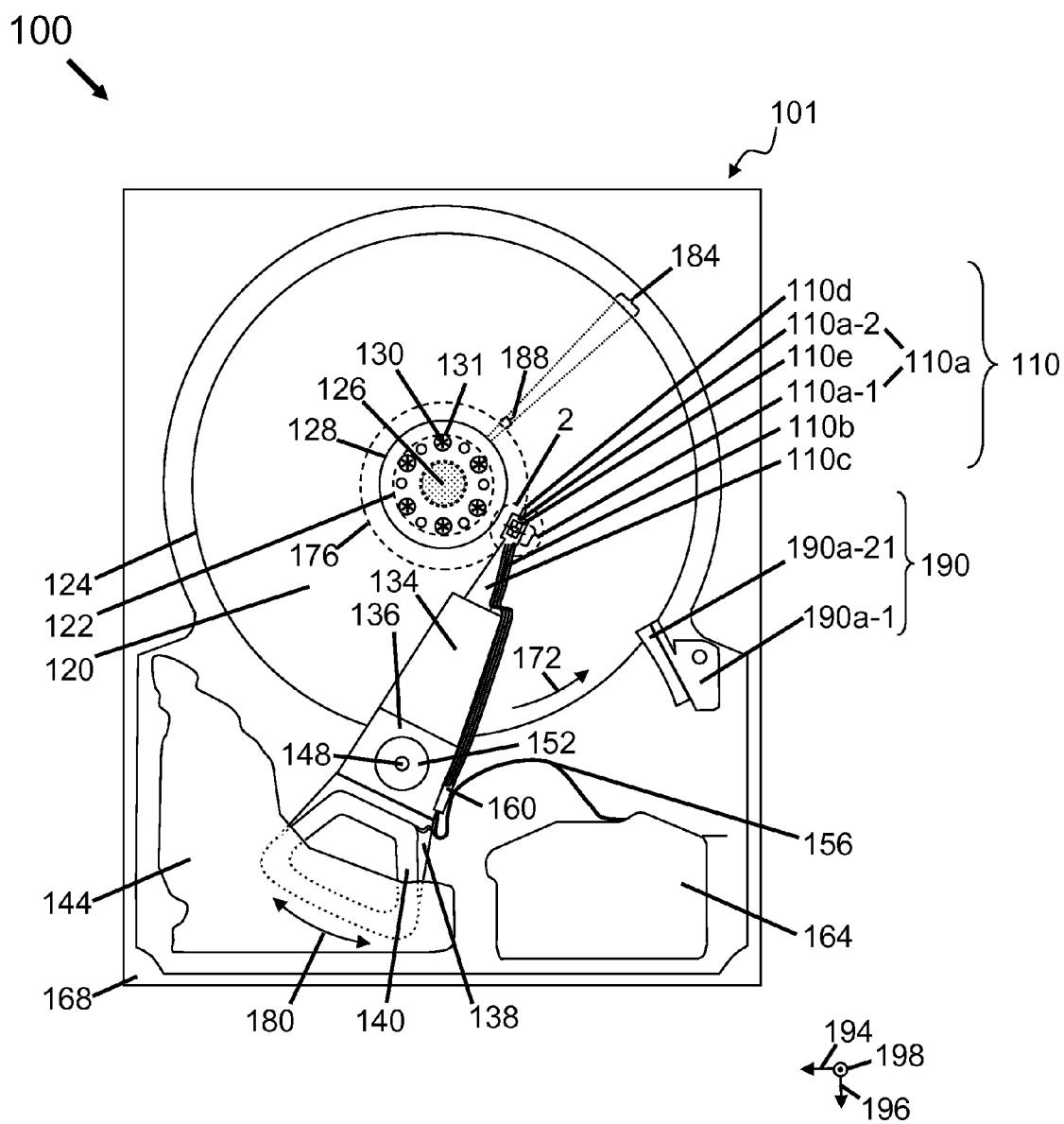
FIG. 1 is a plan view illustrating the arrangement of components within an example environment of a hard-disk drive (HDD) that includes a head-gimbal assembly (HGA) with a plurality of suspension-lead pads, each having a form that is configured to inhibit formation of an inter-pad solder bridge, in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Physical Description of Embodiments of a Head-Gimbal Assembly with a Suspension-Lead Pad Having a Form that is Configured to Inhibit Formation of an Inter-Pad Solder Bridge With reference now to FIG. 1, in accordance with embodiments of the present invention, a plan view 100 of a hard-disk drive (HDD) 101 is shown. In subsequent description of HDD 101, embodiments of the present invention incorporate within the environment of HDD 101, without limitation thereto, the subsequently described embodiments of the present invention for a head-gimbal assembly (HGA) 110 with a suspension-lead pad, for example, suspension-lead pad 220a, as shown in FIGS. 2 and 3A-3H, without limitation thereto, having a form that is configured to inhibit formation of an inter-pad solder bridge, and a head-slider 110a with a head-slider pad of a plurality 210 of head-slider pads, for example, the plurality 210 of head-slider pads as shown in FIGS. 3B, 3D, 3E, 3G and 3H, without limitation thereto, also having a form that is configured to inhibit formation of an inter-pad solder bridge.

With further reference to FIG. 1, in accordance with one or more embodiments of the present invention, the arrangement of components within HDD 101 is illustrated. HDD 101 includes a HGA 110 with a suspension-lead pad, for example, suspension-lead pad 220a (see FIGS. 2 and 3A-3H), having a form that is configured to inhibit formation of an inter-pad solder bridge. HDD 101 includes at least one such HGA 110. The HGA 110 includes a gimbal 110e, a head-slider 110a, and a plurality 220 of suspension-lead pads 220a-220f (see FIGS. 2 and 3A-3H). The head-slider 110a includes a slider 110a-1, and a magnetic-recording head 110a-2 coupled with the slider 110a-1. The HGA 110 further includes a lead-suspension 110b attached to the head-slider 110a, and a load beam 110c attached to a head-slider 110a, which includes the magnetic-recording head 110a-2 at a distal end of the head-slider 110a. The head-slider 110a is attached at the distal end of the load beam 110c to the gimbal 110e, which is attached to the load beam 110c. HDD 101 also includes at least one magnetic-recording disk 120 rotatably mounted on a spindle 126 and a spindle motor (not shown) mounted in a disk-enclosure base 168 and attached to the spindle 126 for rotating the magnetic-recording disk 120. Thus, the HGA 110 also includes a tongue 110d, which is used in loading and unloading the head-slider 110a from the magnetic-recording disk 120, using a load-unload ramp structure 190 including a load-unload ramp 190a-21 and bracket 190a-1. The magnetic-recording disk has an inside-diameter edge 122, and an outside-diameter edge 124, which are often informally referred to as the inside-diameter and the outside diameter, it being understood that these terms of art refer to the corresponding portion of the disk. The magnetic-recording head 110a-2 that includes a write element 110a-21, a so-called writer, and a read element 110a-22, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, may be affixed to the spindle 126 with a disk clamp 128. The disk clamp 128 is provided with fastener holes, for example, fastener hole 130, and clamps the magnetic-recording disk 120, or magnetic recording disks (not shown), to a hub (not shown) with fasteners, of which fastener 131 is an example. HDD 101 further includes an actuator arm 134 attached to HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the actuator arm 134 and HGA 110 to access portions of the magnetic-recording disk 120, as the carriage 136 is mounted on a pivot-shaft 148 with an interposed pivot-bearing assembly 152.

With further reference to FIG. 1, in accordance with one or more embodiments of the present invention, electrical signals, for example, current to the voice coil 140 of the VCM, write signals to and read signals from the magnetic-recording head 110a-2, are provided by a flexible cable 156. Interconnection between the flexible cable 156 and the magnetic-recording head 110a-2 may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 168. The disk-enclosure base 168, also referred to as a base casting, depending upon whether the disk-enclosure base 168 is cast, in conjunction with an HDD cover (not shown) provides a sealed, except for a breather filter (not shown), protective disk enclosure for the information storage components of HDD 101.

With further reference to FIG. 1, in accordance with one or more embodiments of the present invention, other electronic components (not shown), including a disk controller and servo electronics including a digital-signal processor (DSP), provide electrical signals to the spindle motor, the voice coil 140 of the VCM and the magnetic-recording head 110a-2 of HGA 110. The electrical signal provided to the spindle motor enables the spindle motor to spin providing a torque to the spindle 126 which is in turn transmitted to the magnetic-recording disk 120 that is affixed to the spindle 126 by the disk clamp 128; as a result, the magnetic-recording disk 120 spins in direction 172. The spinning magnetic-recording disk 120 creates an airflow including an air-stream, and a self-acting air bearing on which the air-bearing surface (ABS) of the head-slider 110a rides so that the head-slider 110a flies in proximity with the recording surface of the magnetic-recording disk 120 to avoid contact with a thin magnetic-recording medium of the magnetic-recording disk 120 in which information is recorded. The electrical signal provided to the voice coil 140 of the VCM enables the magnetic-recording head 110a-2 of HGA 110 to access a track 176 on which information is recorded. As used herein, "access" is a term of art that refers to operations in seeking the track 176 of the magnetic-recording disk 120 and positioning the magnetic-recording head 110a-2 on the track 176 for both reading data from, and writing data to, the magnetic-recording disk 120. The armature 138 of the VCM swings through an arc 180 which enables HGA 110 attached to the armature 138 by the actuator arm 134 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element 110a-22 of the magnetic-recording head 110a-2 of HGA 110 reads the servo-burst-signal pattern which provides a position-error-signal (PES) to the servo electronics, which controls the electrical signal provided to the voice coil 140 of the VCM, enabling the magnetic-recording head 110a-2 to follow the track 176. Upon finding the track 176 and identifying a particular sectored track portion 188, the magnetic-recording head 110a-2 either reads data from the track 176, or writes data to, the track 176 depending on instructions received by the disk controller from an external agent, for example, a microprocessor of a computer system.

As shown in FIG. 1, the direction of arrow 196 is about parallel to the long side of the disk-enclosure base 168 of HDD 101; the direction of arrow 194 is perpendicular to arrow 196 and is about parallel to the short side of the disk-enclosure base 168 of HDD 101; and, arrow 198, which is indicated by the arrow head of arrow 198, is about perpendicular to the plane of the disk-enclosure base 168, as well as the plane of the recording surface of the magnetic recording disk 120, and therefore is perpendicular to arrows 194 and 196. Thus, the triad of arrows 194, 196 and 198 are related to one another by the right-hand rule for vectors in the direction of the arrows 194, 196 and 198 such that the cross product of the vector corresponding to arrow 194 and the vector corresponding to arrow 196 produces a vector parallel and oriented in the direction of the arrow 198. The triad of arrows 194, 196 and 198 is subsequently used to indicate the orientation of views for subsequently described drawings of HGA 110. Also as shown in FIG. 1, a reference circle 2 is provided to indicate the portion of the HGA 110 subsequently described in the discussion of FIG. 2.

As used herein, component parts of HDD 101 have different sides referred to by at least the following terms of art: a side facing into the direction 172 of motion of the magnetic-recording disk and, thus, into the direction of airflow, a leading-edge (LE) side; a side facing away from the direction 172 of motion of the magnetic-recording disk and, thus, away from the direction of airflow, a trailing-edge (TE) side.

As described above with reference to FIG. 1 and to subsequently described FIGS. 2 and 3A-3H, embodiments of the present invention encompass within their scope a HDD 101 that includes a magnetic-recording disk 120, a disk enclosure including a disk-enclosure base 168, a spindle motor affixed in the disk-enclosure base 168, for rotating the magnetic-recording disk 120, an actuator arm 134, and a HGA 110 attached to the actuator arm 134. In accordance with one or more embodiments of the present invention, the HGA 110 includes a gimbal 110e, a head-slider 110a coupled with the gimbal 110e, and a plurality 220 of suspension-lead pads 220a-220f. In accordance with one or more embodiments of the present invention, the head-slider includes a slider 110a-1, and a magnetic-recording head 110a-2 coupled with the slider 110a-1. In accordance with one or more embodiments of the present invention, the magnetic-recording head 110a-2 includes a write element 110a-21 configured to write data to the magnetic-recording disk 120, a read element 110a-22 configured to read data from the magnetic-recording disk 120, and a plurality 210 of head-slider pads 210a-210f. In accordance with one or more embodiments of the present invention, the plurality 220 of suspension-lead pads 220a-220f is coupled respectively with the plurality 210 of head-slider pads 210a-210f by a plurality 230 of respective solder bonds 230a-230f. In accordance with one or more embodiments of the present invention, a suspension-lead pad 220a of the plurality 220 of suspension-lead pads 220a-220f includes a first lateral side 220a-1, a second lateral side 220a-2, a proximal side 220a-3, disposed in proximity to a respective head-slider pad 210a, and a distal side 220a-4, disposed distally from the respective head-slider pad 210a. In accordance with one or more embodiments of the present invention, a first width of the suspension-lead pad 220a closer to the proximal side 220a-3, for example, width 220a-5 of suspension-lead pad 220a at proximal side 220a-3, is substantially larger than a second width of the suspension-lead pad 220a, for example, width 220a-5 of suspension-lead pad 220a at distal side 220a-4, further from the proximal side 220a-3 than the first width. In accordance with one or more embodiments of the present invention, the HGA 110 is configured to support the head-slider 110a in proximity with a recording surface of the magnetic-recording disk 120 when the magnetic-recording disk 120 is rotated by the spindle motor, and the actuator arm 134 is configured to be pivoted by a voice coil motor for accessing data on the magnetic-recording disk 120.

Figure 2:
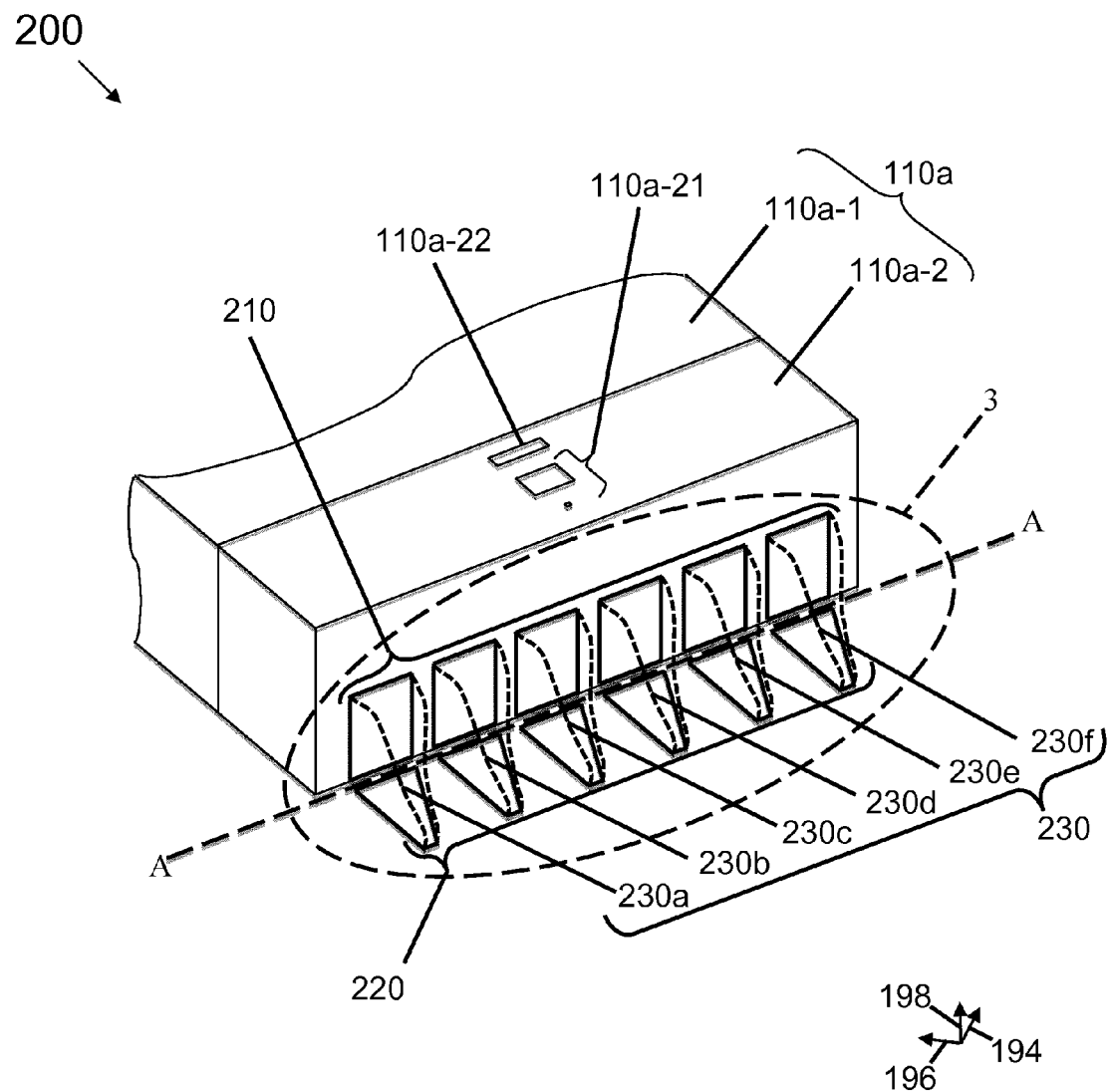
FIG. 2 is an enlarged perspective view of the portion of the HGA enclosed by circle 2 of FIG. 1, detailing a plurality of suspension-lead pads in communication with a plurality of head-slider pads at the trailing edge of the head-slider joined together in pairs by a plurality of solder bonds without the formation of inter-pad solder bridges, in accordance with one or more embodiments of the present invention.
Figure 3A:
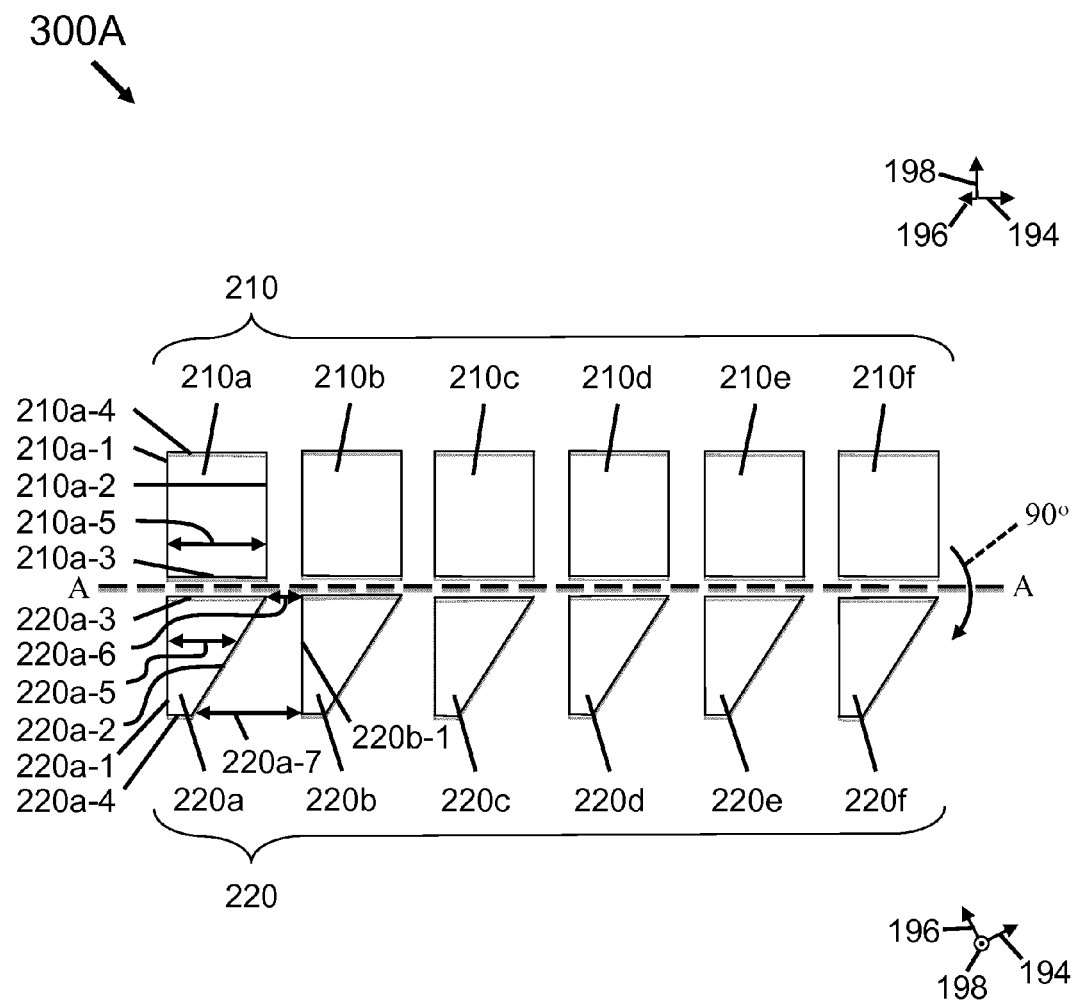
FIG. 3A is a plan view of a first example arrangement of the suspension-lead pads and the head-slider pads of the portion of the HGA enclosed by oval 3 of FIG. 2, with the suspension-lead pads rotated about the axis A-A into the same plane as the head-slider pads and with the solder bonds removed for convenience of viewing, in accordance with one or more embodiments of the present invention.

With reference now to FIG. 2 and further reference to FIG. 1, in accordance with embodiments of the present invention, an enlarged perspective view 200 of the portion of the HGA 110 enclosed by circle 2 of FIG. 1 is shown. As shown in FIG. 2, the triad of arrows 194, 196 and 198 indicates the orientation in which HGA 110 is viewed in perspective view 200 relative to the plan view 100 of FIG. 1. FIG. 2 shows in detail a plurality 220 of suspension-lead pads 220a-220f (FIG. 3A) in communication with a plurality 210 of head-slider pads 210a-210f (FIG. 3A) at the trailing edge of the head-slider 110a joined together in pairs by a plurality 230 of solder bonds 230a-230f without the formation of inter-pad solder bridges. A line on either side of which the plurality 220 of suspension-lead pads 220a-220f (FIG. 3A) and the plurality 210 of head-slider pads 210a-210f (FIG. 3A) are about symmetrically arranged for interconnection is indicated by line A-A. The HGA 110 includes a gimbal 110e, a head-slider 110a coupled with the gimbal 110e, and a plurality 220 of suspension-lead pads 220a-220f (FIG. 3A). As shown in FIG. 2, the head-slider 110a includes a slider 110a-1, a magnetic-recording head 110a-2 coupled with the slider 110a-1, and a plurality 210 of head-slider pads 210a-210f (FIG. 3A). The magnetic-recording head 110a-2 includes a write element 110a-21 configured for writing data to a magnetic-recording disk 120, and a read element 110a-22 configured for reading data from the magnetic-recording disk 120. In accordance with embodiments of the present invention, the plurality 220 of suspension-lead pads 220a-220f (FIG. 3A) is coupled respectively with the plurality 210 of head-slider pads 210a-210f (FIG. 3A) by a plurality 230 of respective solder bonds 230a-230f.

Embodiments of the present invention as shown in FIG. 2, and described elsewhere herein, are related to the geometrical structure of the plurality 220 of suspension-lead pads 220a-220f (FIGS. 2 and 3A-3H) and the plurality 210 of head-slider pads 210a-210f (FIGS. 2 and 3A-3H). In accordance with embodiments of the present invention, the geometrical structure of the plurality 210 of head-slider pads 210a-210f (FIGS. 2 and 3A-3H) may be produced through the use of suitable masks designed to produce such geometrical structures in the fabrication process of the head-slider 110a. Similarly, in accordance with embodiments of the present invention, the geometrical structure of the plurality 220 of suspension-lead pads 220a-220f (FIGS. 2 and 3A-3H) may be produced through the use of suitable masks designed to produce such geometrical structures in the fabrication process of the lead-suspension 110b. As shown in FIG. 2, oval 3 surrounds the portion of HGA 110 that includes the plurality 220 of suspension-lead pads 220a-220f (FIG. 3A) and the plurality 210 of head-slider pads 210a-210f (FIG. 3A), which is next described in greater detail.

With reference now to FIG. 3A, in accordance with embodiments of the present invention, a plan view 300A of a first example arrangement of the plurality 220 suspension-lead pads 220a-220f and the plurality 210 of head-slider pads 210a-210f of the portion of the HGA 110 enclosed by oval 3 of FIG. 2 is shown. As shown in FIG. 3A, the plurality 220 suspension-lead pads 220a-220f and the plurality 210 of head-slider pads 210a-210f is shown with the solder bonds removed; and, the plurality 220 suspension-lead pads 220a-220f is rotated about the axis A-A into the same plane as the plurality 210 of head-slider pads 210a-210f for convenience of viewing. The angle of rotation about the axis A-A is about equal to 90° as shown in FIG. 3A; and similarly, the angle of rotation about the axis A-A is about equal to 90° as is shown in subsequent FIGS. 3B-3H. As shown in FIG. 2, the upper triad of arrows 194, 196 and 198 indicates the orientation in which the trailing edge of the magnetic-recording head 110a-2 of head-slider 110a is viewed in plan view 300A relative to the plan view 100 of FIG. 1; and, the lower triad of arrows 194, 196 and 198 indicates the orientation in which the lead-suspension 110b of the HGA 110 is viewed in plan view 300A relative to the plan view 100 of FIG. 1; and similarly, the arrangement of the upper and lower triads of arrows 194, 196 and 198 applies to subsequently-described, respective plan views of FIGS. 3B-3H relative to the plan view 100 of FIG. 1.

With further reference to FIG. 3A, in accordance with embodiments of the present invention, a suspension-lead pad 220a of the plurality 220 of suspension-lead pads 220a-220f includes a first lateral side 220a-1, a second lateral side 220a-2, a proximal side 220a-3, disposed in proximity to a respective head-slider pad 210a, and a distal side 220a-4, disposed distally from the respective head-slider pad 210a. As used herein, the terms of art, "distal" and "distally," as used with respect to sides or portions of a pad of the plurality 220 of suspension-lead pads 220a-220f, or alternatively, a pad of the plurality 210 of head-slider pads 210a-210f, means a side or portion of the pad that lies further away from line A-A than a side or portion of the pad that lies closer to line A-A. Similarly, the terms of art, "proximal" and "proximally," as used with respect to sides or portions of a pad of the plurality 220 of suspension-lead pads 220a-220f, or alternatively, a pad of the plurality 210 of head-slider pads 210a-210f, means a side or portion of the pad that lies closer to line A-A than a side or portion of the pad that lies further away from line A-A.

As shown in FIG. 3A, in accordance with embodiments of the present invention, the suspension lead pad has a width, for example, width 220a-5 of suspension-lead pad 220a. The width of the suspension lead pad is defined herein as a length of a line segment about parallel to the line A-A that extends from a first lateral to a second lateral side of a suspension lead pad. The width of the suspension lead pad may also be about parallel to a proximal side of the suspension lead pad, without limitation thereto. The width of the suspension lead pad may vary in length as measured across a suspension lead pad when measured closer to a proximal side, or when measured closer to a distal side of the suspension lead pad. For example, as shown in FIG. 3A, the width 220a-5 of the suspension-lead pad 220a in proximity to the proximal side 220a-3 is greater than the width 220a-5 of the suspension-lead pad 220a in proximity to the distal side 220a-4. As described herein, a first width of a suspension-lead pad, for example, width 220a-5 of suspension-lead pad 220a at proximal side 220a-3, is disposed closer to a proximal side than a second width of a suspension-lead pad, for example, width 220a-5 of suspension-lead pad 220a at distal side 220a-4. If the first width of the suspension-lead pad is disposed in proximity to a proximal side, the first width may be referred to herein as a proximal width of the suspension-lead pad. If the second width of a suspension-lead pad is disposed in proximity to a distal side, the second width may be referred to herein as a distal width of the suspension-lead pad. In accordance with embodiments of the present invention, a first width of the suspension-lead pad is substantially larger than a second width of the suspension-lead pad further from the proximal side than the first width. For example, the first width of the suspension-lead pad 220a is substantially larger than a second width of the suspension-lead pad 220a further from the proximal side 220a-3 than the first width.

As used herein, the term of art, "substantially larger," as used with respect to the widths of suspension-lead pads 220a-220f, of which width 220a-5 of suspension-lead pad 220a (FIG. 3A-3H) is an example, and the widths of head-slider pads 210a-210f, of which width 210a-5 of head-slider 110a (FIG. 3A-3H) is an example, means that the width is larger by an amount greater than the variation in the location of a side of a respective suspension-lead pad, or head-slider pad, as determined by process variations associated with fabricating a pad with a specified dimension. For example, a rectangular pad might be fabricated with a specified width of 300 microns ($10^{-6}$ mm) with a manufactured variation of plus or minus 1 μm; a width of a portion of a pad "substantially larger" than the width of another portion of a pad would be greater than the manufactured variation, which in the given example would be greater than 1 μm.

With further reference to FIG. 3A, in accordance with embodiments of the present invention, the first lateral side 220a-1 and the second lateral side 220a-2 of the suspension-lead pad 220a lie substantially along respective straight-line segments. As used herein, the term of art, "substantially along," as used with respect to respective straight-line segments lying along any of the respective sides of suspension-lead pads 220a-220f, of which first lateral side 220a-1, second lateral side 220a-2, proximal side 220a-3, and a distal side 220a-4 of suspension-lead pad 220a (FIG. 3A-3H) are examples, and respective straight-line segments lying along any of the respective sides of head-slider pads 210a-210f, of which first lateral side 210a-1, second lateral side 210a-2, proximal side 210a-3, and a distal side 210a-4 of head-slider pad 210a (FIG. 3A-3H) are examples, means that a respective straight-line segment lies at about the average position of the edge of the pad corresponding to the respective side of the suspension-lead pad, or alternatively, the head-slider pad. For example, the average position of the edge of a pad might be found by least squares fitting the line segment corresponding to the respective side of the pad to the position of the respective edge of the pad, without limitation thereto, as other definitions of the average position are also within the spirit and scope of embodiments of the present invention. In accordance with embodiments of the present invention, the straight-line segment corresponding to the first lateral side 220a-1 of the suspension-lead pad 220a is not parallel to the straight-line segment corresponding to the second lateral side 220a-2 of the suspension-lead pad 220a.

With further reference to FIG. 3A, in accordance with embodiments of the present invention, a proximal inter-pad distance 220a-6 is defined between the second lateral side 220a-2 of the suspension-lead pad 220a and an adjacent first lateral side 220b-1 of an adjacent suspension-lead pad 220b at the proximal side 220a-3 of the suspension-lead pad 220a. A distal inter-pad distance 220a-7 is similarly defined between the second lateral side 220a-2 of the suspension-lead pad 220a and the adjacent first lateral side 220b-1 of the adjacent suspension-lead pad 220b at the distal side 220a-4 of the suspension-lead pad 220a. In accordance with embodiments of the present invention, the proximal inter-pad distance 220a-6 is substantially less than the distal inter-pad distance 220a-7. As used herein, the term of art, "substantially less," as used with respect to inter-pad distances between suspension-lead pads 220a-220f, of which proximal inter-pad distance 220a-6 and distal inter-pad distance 220a-7 between suspension-lead pads 220a and 220b (FIG. 3A-3H) are examples, and inter-pad distances between head-slider pads 210a-210f, of which proximal inter-pad distance 210a-6 and distal inter-pad distance 210a-7 of head-slider pads 210a and 210b (FIG. 3A-3H) are examples, means that the inter-pad distance is smaller by an amount greater than the variation in the location of a side of a respective suspension-lead pad, or alternatively, of a respective head-slider pad, as determined by process variations associated with fabricating a pad with a specified dimension. In accordance with embodiments of the present invention, the inter-pad distance between the second lateral side 220a-2 of the suspension-lead pad 220a and an adjacent first lateral side 220b-1 of an adjacent suspension-lead pad 220b is substantially less in proximity to a head-slider pad 210a than distally from the head-slider pad 210a. In accordance with embodiments of the present invention, the plurality 220 of suspension-lead pads 220a-220f includes a fan-out structure, wherein proximal sides, of which proximal side 220a-3 is an example, of the plurality 220 of suspension-lead pads 220a-220f, disposed in proximity to the plurality 210 of respective head-slider pads 210a-210f are spaced closer together than distal sides, of which distal side 220a-4 is an example, of the plurality 220 of suspension-lead pads 220a-220f, disposed distally from the plurality 210 of respective head-slider pads 210a-210f.

With further reference to FIG. 3A, in accordance with embodiments of the present invention, the closer the sides of pads lie with respect to one another, the greater is the probability that an inter-pad solder bridge might form. Thus, embodiments of the present invention provide for reducing the probability of the formation of an inter-pad solder bridge by increasing the spacing, or distance, between the sides of pads consistent with maintaining good mechanical integrity of the solder bond between a suspension-lead pad and a head-slider pad. The mechanical integrity of the solder bond increases as the cross-sectional area of the bond increases in proximity to the junction between the suspension-lead pads and the head-slider pads at line A-A. With increasing areal density of recorded information and increasing demand for lower cost HDDs, head-sliders are reduced in size, and the number of head-slider pads increases at the trailing edge of the head-slider, so that the cross-sectional area of a solder bond is likely to decrease, while the spacing between head-slider pads is also likely to decrease. Thus, in accordance with embodiments of the present invention, pads that are wider in proximity to the junction between the suspension-lead pads and the head-slider pads at line A-A, but narrower further away from line A-A provide for greater immunity to the formation of inter-pad solder bridges, while maintaining the mechanical strength of the solder bond at the junction between the suspension-lead pads and the head-slider pads at line A-A within the constraints of a head-slider design utilizing an ever smaller head-slider having six, eight, or even more head-slider pads. Although the head-slider 110a is shown herein with six head-slider pads 210a-210f, this is by way of example without limitation thereto, as head-sliders with fewer or more than six head-slider pads are also within the spirit and scope of embodiments of the present invention. By way of example, without limitation thereto, the six head-slider pads 210a-210f, may provide: a pair of input terminals to the write element 110a-21; a pair of output terminals from the read element 110a-22; and, a pair of input terminals to a thermal-fly-height-control (TFC) element (not shown), but embedded within the head-slider 110a. In accordance with embodiments of the present invention, the suspension-lead pad 220a is configured as a terminal coupled with an end of a suspension-lead of the lead-suspension 110b.

Thus, with further reference to FIG. 3A, in accordance with embodiments of the present invention, at least one of the plurality 220 of suspension-lead pads 220a-220f is configured with a shape in a plane in which the suspension-lead pad 220a substantially lies that inhibits bridging of solder to an adjacent suspension-lead pad 220b. As used herein, the phrase, "a plane in which . . . pad substantially lies," as used with respect to surfaces upon which a pad being one of the plurality 220 of suspension-lead pads 220a-220f, or alternatively, a pad being one of the plurality 210 of head-slider pads 210a-210f, lies means that the respective surface is about planar so that the shape of a pad defined by the edges of the pad, when seen as projected onto that surface, appears to be a planar shape. Thus, in accordance with embodiments of the present invention, surface-tension forces between the solder and a surface of the suspension-lead pad 220a confine flow of solder in the solder bond 230a to a region determined by a shape of the suspension-lead pad 220a.

With further reference to FIG. 3A, in accordance with embodiments of the present invention, the head-slider 110a also includes a plurality 210 of head-slider pads 210a-210f. A head-slider pad of the plurality 210 of head-slider pads 210a-210f includes a first lateral side, a second lateral side, a proximal side, which is configured for being disposed in proximity to a respective suspension-lead pad, and a distal side, which is configured for being disposed distally from the respective suspension-lead pad. For example, head-slider pad 210a of the plurality 210 of head-slider pads 210a-210f includes a first lateral side 210a-1, a second lateral side 210a-2, a proximal side 210a-3, and a distal side 210a-4. In accordance with embodiments of the present invention, the first lateral side 210a-1 and the second lateral side 210a-2 of the head-slider pad 210a lie substantially along respective straight-line segments, and the straight-line segment corresponding to the first lateral side 210a-1 of the head-slider pad 210a is substantially parallel to the straight-line segment corresponding to the second lateral side 210a-2 of the head-slider pad 210a. As used herein, term of art, "substantially parallel," as used with respect to sides of head-slider pads 210a-210f, or alternatively, sides of suspension-lead pads 220a-220f, means that straight-line segments corresponding to a respective pair of sides of pads are about parallel to one another within the manufacturing tolerances that can be achieved in fabricating such pads.

Figure 3B:
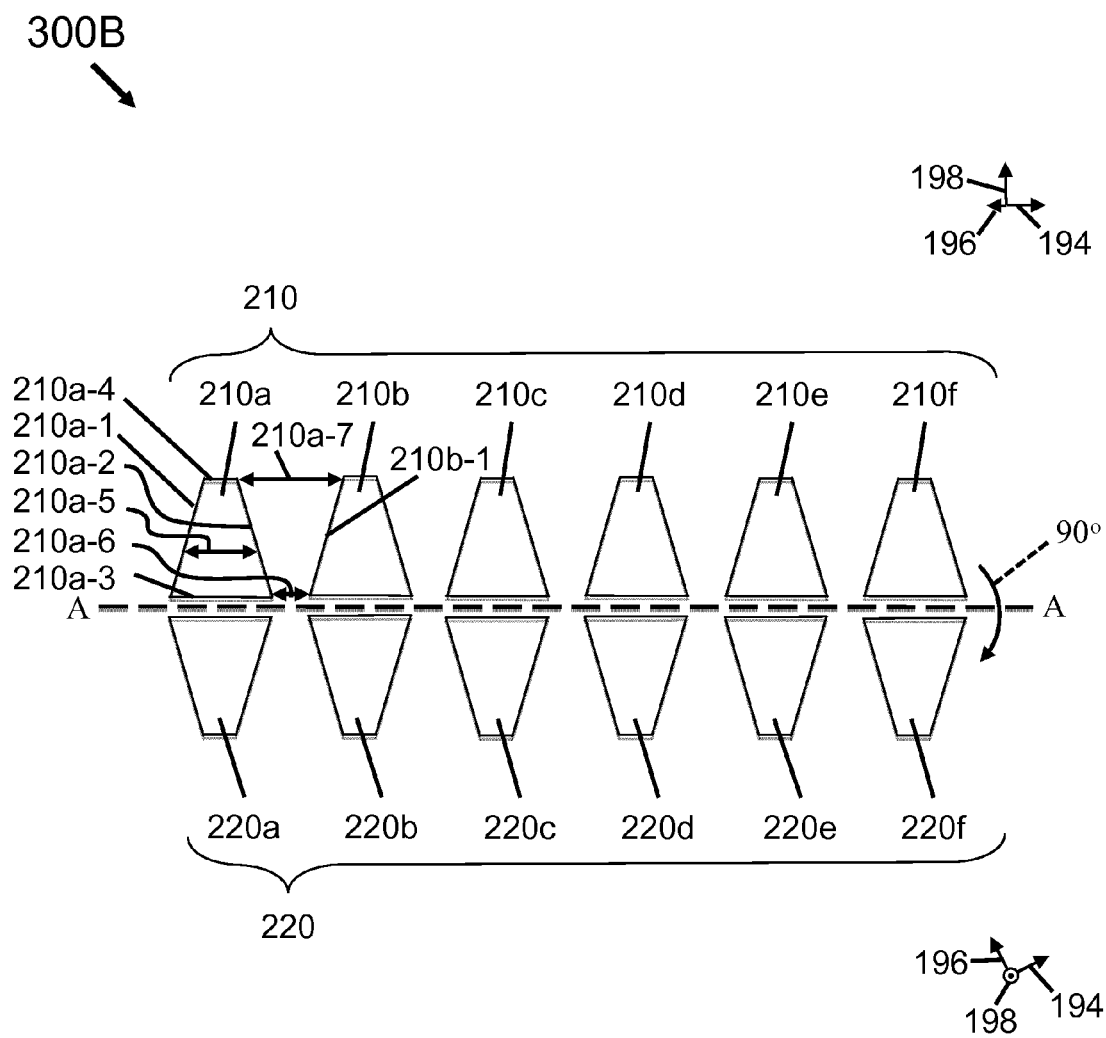
FIG. 3B is a plan view of a second example arrangement of the suspension-lead pads and the head-slider pads, oriented similar to FIG. 3A, in accordance with one or more embodiments of the present invention.

With reference now to FIG. 3B, in accordance with embodiments of the present invention, a plan view 300B of a second example arrangement of the suspension-lead pads 220a-220f and the head-slider pads 210a-210f, which is oriented similar to FIG. 3A, is shown. In accordance with embodiments of the present invention, a first width of the head-slider pad 210a closer to the proximal side 210a-3, for example, width 210a-5 of head-slider pad 210a at proximal side 210*a*-3, is substantially larger than a second width of the head-slider pad 210*a* further from the proximal side 210*a*-3 than the first width, for example, width 210*a*-5 of head-slider pad 210*a* at distal side 210*a*-4. In accordance with embodiments of the present invention, the first lateral side 210*a*-1 and the second lateral side 210*a*-2 of the head-slider pad 210*a* lie substantially along respective straight-line segments, and the straight-line segment corresponding to the first lateral side 210*a*-1 of the head-slider pad 210*a* is not parallel to the straight-line segment corresponding to the second lateral side 210*a*-2 of the head-slider pad 210*a*. Thus, in accordance with embodiments of the present invention, a width of a proximal side 210*a*-3 of a head-slider pad 210*a* disposed in proximity to a respective suspension-lead pad 220*a* is larger than a width of a distal side 210*a*-4 of the head-slider pad 210*a* disposed distally from the respective suspension-lead pad 220*a*.

With further reference to FIG. 3B, in accordance with embodiments of the present invention, a proximal inter-pad distance 210*a*-6 is defined between the second lateral side 210*a*-2 of the head-slider pad 210*a* and an adjacent first lateral side 210*b*-1 of an adjacent head-slider pad 210*b* at the proximal side 210*a*-3 of the head-slider pad 210*a*. In accordance with embodiments of the present invention, a distal inter-pad distance 210*a*-7 is similarly defined between the second lateral side 210*a*-2 of the head-slider pad 210*a* and the adjacent first lateral side 210*b*-1 of the adjacent head-slider pad 210*b* at the distal side 210*a*-4 of the head-slider pad 210*a*. In accordance with embodiments of the present invention, the inter-pad distance between the second lateral side 210*a*-2 of the head-slider pad 210*a* and an adjacent first lateral side 210*b*-1 of an adjacent head-slider pad 210*b* is substantially less in proximity to a suspension-lead pad 220*a* than distally from the suspension-lead pad 220*a*. In accordance with embodiments of the present invention, the plurality 210 of head-slider pads 210*a*-210*f* includes a fan-out structure, wherein proximal sides, of which proximal side 210*a*-3 is an example, of the plurality 210 of head-slider pads 210*a*-210*f*, disposed in proximity to the plurality 220 of respective suspension-lead pads 220*a*-220*f* are spaced closer together than distal sides, of which distal side 210*a*-4 is an example, of the plurality 210 of head-slider pads 210*a*-210*f*, disposed distally from the plurality 220 of respective suspension-lead pads 220*a*-220*f*.

With further reference to FIG. 3B, in accordance with embodiments of the present invention, the plurality 210 of head-slider pads 210*a*-210*f* may include an array of head-slider pads 210*a*-210*f* that are configured with shapes in a plane in which the head-slider pads 210*a*-210*f* substantially lie that are shapes of isosceles trapezoids. Similarly, as shown in FIG. 3B, in accordance with one embodiment of the present invention, the plurality 220 of suspension-lead pads 220*a*-220*f* may include an array of suspension-lead pads 220*a*-220*f* that are configured with shapes in a plane in which the suspension-lead pads 220*a*-220*f* substantially lie that are also shapes of isosceles trapezoids.

Figure 3C:
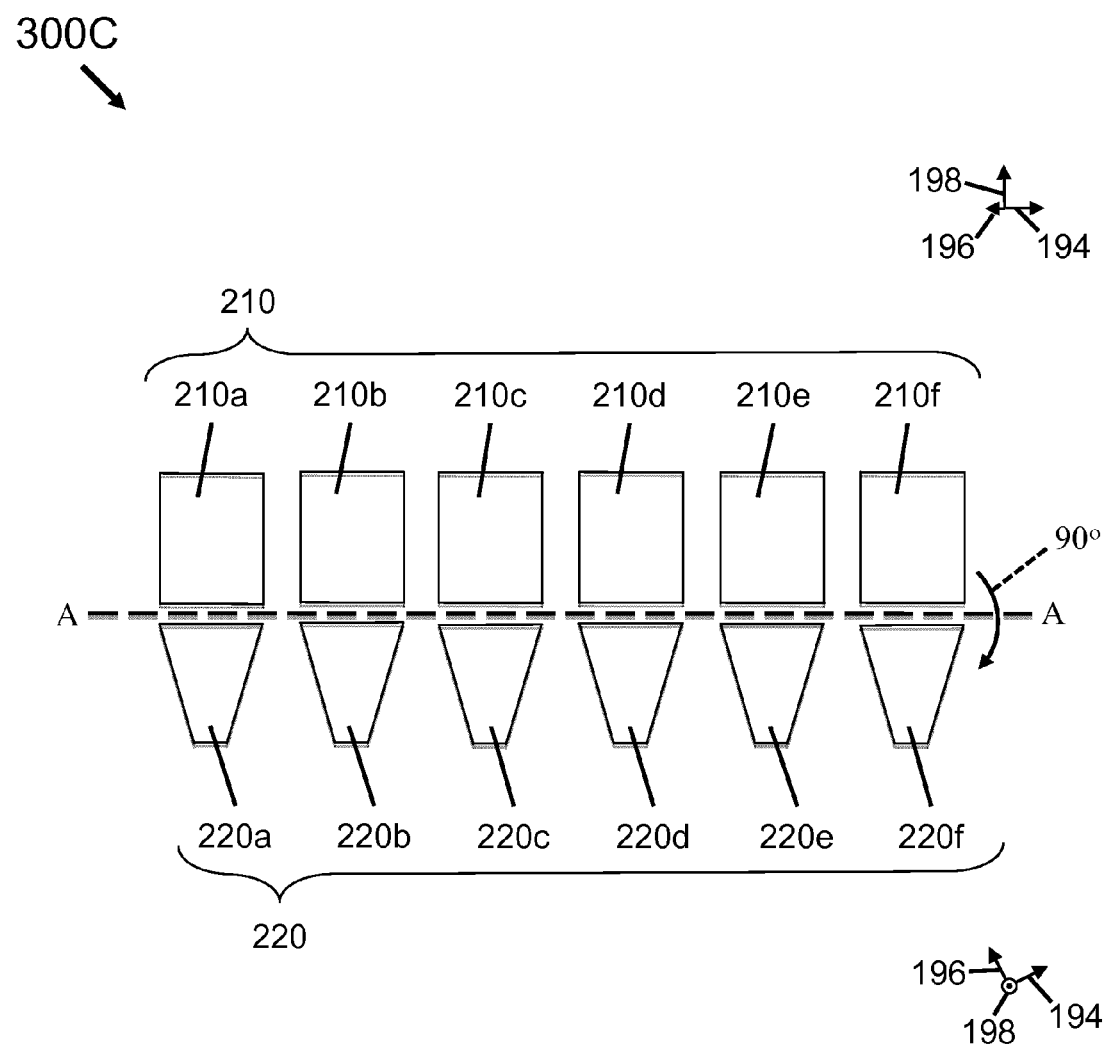
FIG. 3C is a plan view of a third example arrangement of the suspension-lead pads and the head-slider pads, oriented similar to FIG. 3A, in accordance with one or more embodiments of the present invention.

With reference now to FIG. 3C, in accordance with embodiments of the present invention, a plan view 300C of a third example arrangement of the suspension-lead pads 220*a*-220*f* and the head-slider pads 210*a*-210*f*, which is oriented similar to FIG. 3A, is shown. In accordance with embodiments of the present invention, the plurality 210 of head-slider pads 210*a*-210*f* may include an array of head-slider pads 210*a*-210*f* that are configured with shapes in a plane in which the head-slider pads 210*a*-210*f* substantially lie that are substantially rectangular. As used herein, the term of art, "substantially rectangular," as used with respect to the geometrical configuration of respective straight-line segments lying along any of the respective sides of suspension-lead pads 220*a*-220*f*, of which first lateral side 220*a*-1, second lateral side 220*a*-2, proximal side 220*a*-3, and a distal side 220*a*-4 of suspension-lead pad 220*a* (FIG. 3A-3H) are examples, and the geometrical configuration of respective straight-line segments lying along any of the respective sides of head-slider pads 210*a*-210*f*, of which first lateral side 210*a*-1, second lateral side 210*a*-2, proximal side 210*a*-3, and a distal side 210*a*-4 of head-slider pad 210*a* (FIG. 3A-3H) are examples, means that the geometrical configuration of respective straight-line segments of a respective pad defines a geometrical shape that is approximately rectangular. Similar to FIG. 3B, in accordance with embodiments of the present invention, the plurality 220 of suspension-lead pads 220*a*-220*f* may include an array of suspension-lead pads 220*a*-220*f* that are configured with shapes in a plane in which the suspension-lead pads 220*a*-220*f* substantially lie that are shapes of isosceles trapezoids. Thus, in accordance with one embodiment of the present invention, a width 220*a*-5 of the suspension-lead pad 220*a* is determined by relative position of one of the pair of lateral sides 220*a*-1 and 220*a*-2 of the suspension-lead pad 220*a* with respect to the other side of the pair of lateral sides 220*a*-2 and 220*a*-1, respectively, and the width 220*a*-5 of the suspension-lead pad 220*a* is greater with closer proximity of location of the width to a head-slider pad 210*a*.

Figure 3D:
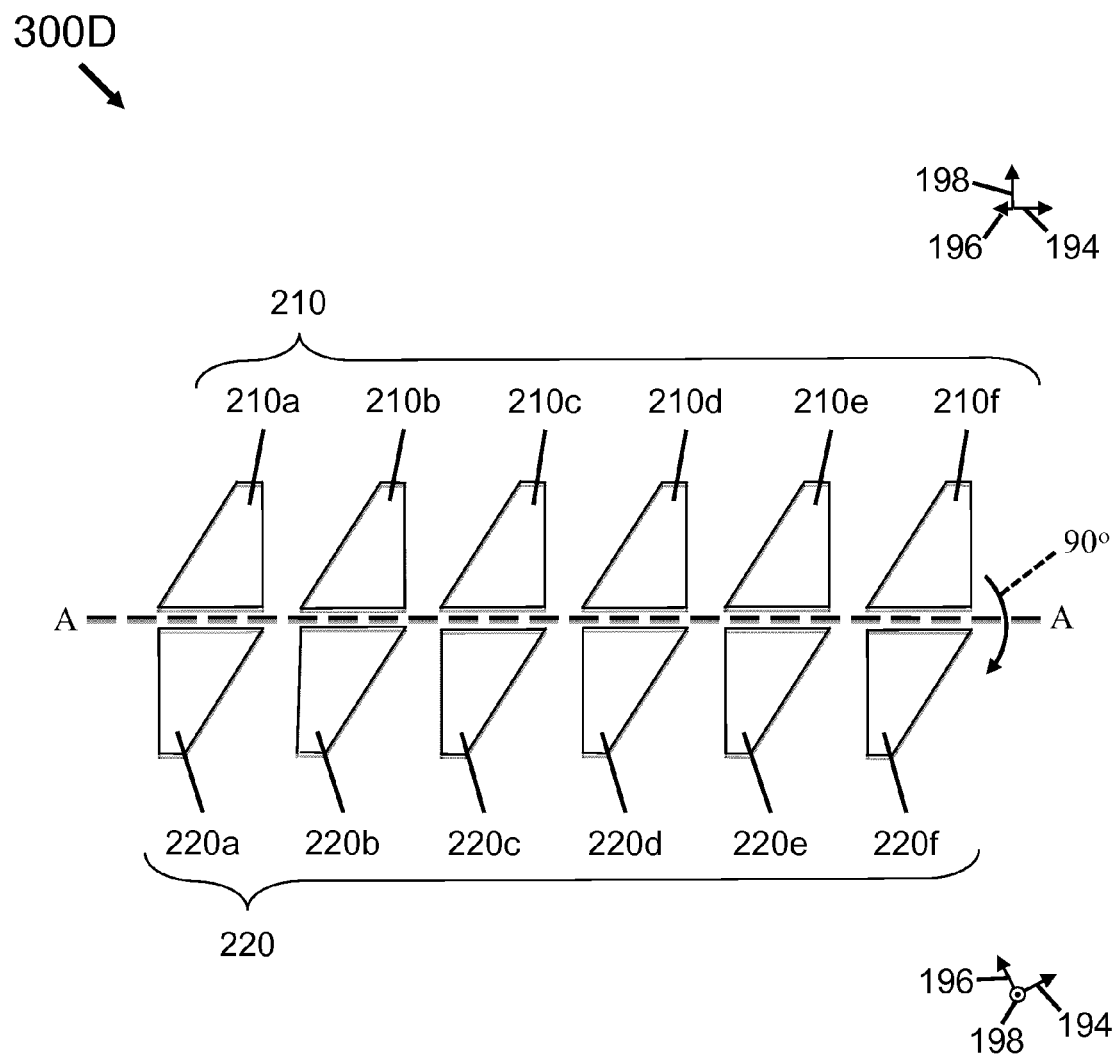
FIG. 3D is a plan view of a fourth example arrangement of the suspension-lead pads and the head-slider pads, oriented similar to FIG. 3A, in accordance with one or more embodiments of the present invention.

With reference now to FIG. 3D, in accordance with embodiments of the present invention, a plan view 300D of a fourth example arrangement of the suspension-lead pads 220*a*-220*f* and the head-slider pads 210*a*-210*f*, which is oriented similar to FIG. 3A, is shown. In accordance with embodiments of the present invention, the plurality 210 of head-slider pads 210*a*-210*f* includes an array of head-slider pads 210*a*-210*f* that are configured with shapes in a plane in which the head-slider pads 210*a*-210*f* substantially lie that are shapes of trapezoidally shaped truncations of right triangles. Similar to FIG. 3A, in accordance with embodiments of the present invention, the plurality 220 of suspension-lead pads 220*a*-220*f* includes an array of suspension-lead pads 220*a*-220*f* that are configured with shapes in a plane in which the suspension-lead pads 220*a*-220*f* substantially lie that are also shapes of trapezoidally shaped truncations of right triangles.

Figure 3E:
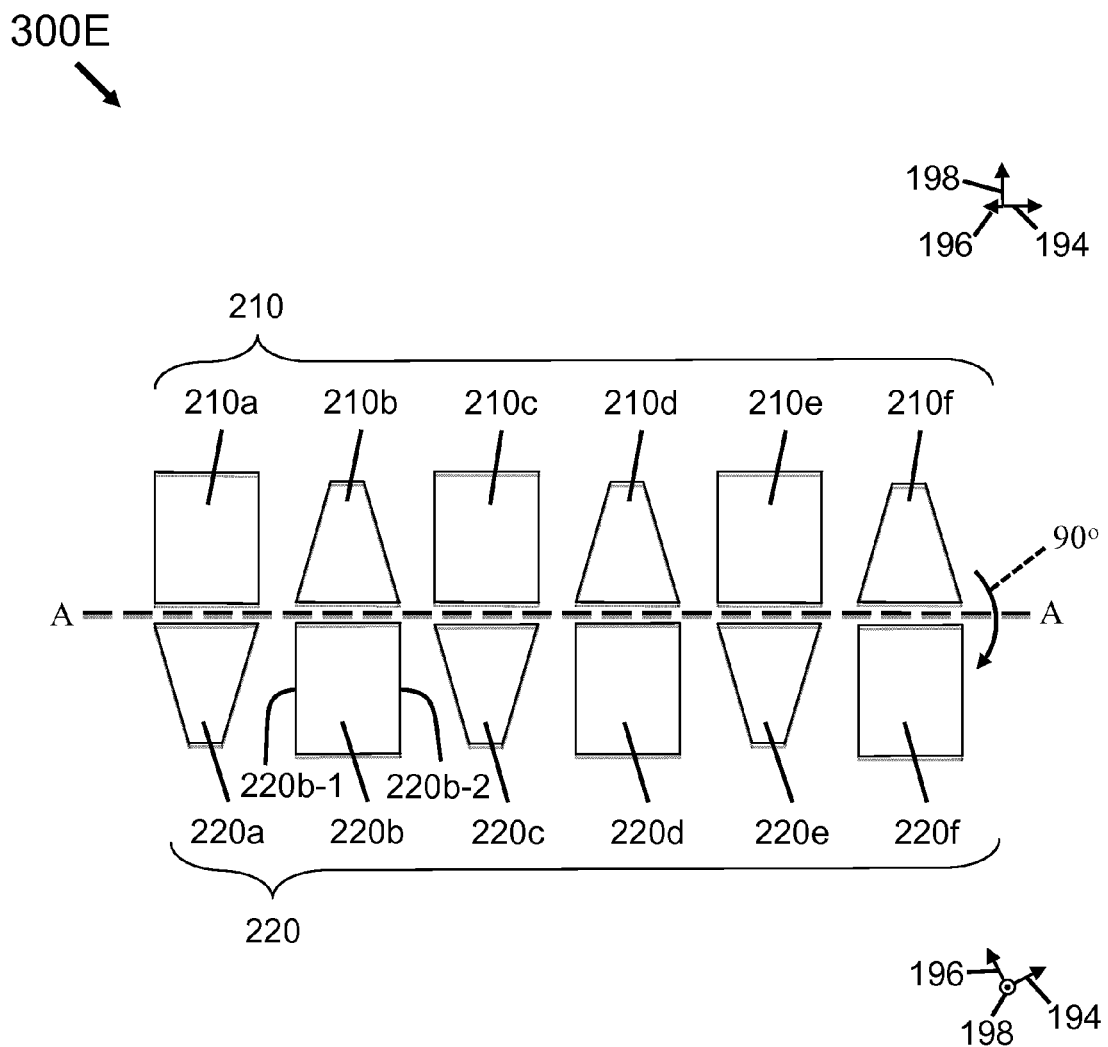
FIG. 3E is a plan view of a fifth example arrangement of the suspension-lead pads and the head-slider pads, oriented similar to FIG. 3A, in accordance with one or more embodiments of the present invention.

With reference now to FIG. 3E, in accordance with embodiments of the present invention, a plan view 300E of a fifth example arrangement of the suspension-lead pads 220*a*-220*f* and the head-slider pads 210*a*-210*f*, which is oriented similar to FIG. 3A is shown. In accordance with embodiments of the present invention, a second suspension-lead pad 220*b* of the plurality 220 of suspension-lead pads 220*a*-220*f* includes a first lateral side 220*b*-1 of the second suspension-lead pad 220*b*, and a second lateral side 220*b*-2 of the second suspension-lead pad 220*b*. In accordance with embodiments of the present invention, the first lateral side 220*b*-1 and the second lateral side 220*b*-2 of the second suspension-lead pad 220*b* lie substantially along respective straight-line segments, and the straight-line segment corresponding to the first lateral side 220*b*-1 of the second suspension-lead pad 220*b* is substantially parallel to the straight-line segment corresponding to the second lateral side 220*b*-2 of the second suspension-lead pad 220*b*. In accordance with embodiments of the present invention, a second suspension-lead pad 220*b* of the plurality 220 of suspension-lead pads 220*a*-220*f* is configured with a shape in a plane in which the second suspension-lead pad 220*b* substantially lies that is substantially rectangular. Thus, in accordance with embodiments of the present invention, the suspension-lead pad 220*a* may be configured with a shape in a plane in which the suspension-lead pad 220a substantially lies that is selected from shapes of figures of the group consisting of a trapezoid, an isosceles trapezoid, and a trapezoid that is a truncation of a right triangle. Moreover, in accordance with embodiments of the present invention, a head-slider pad 210a may be configured with a shape in a plane in which the head-slider pad 210a substantially lies that is selected from shapes of figures of the group consisting of a rectangle, a trapezoid, an isosceles trapezoid, and a trapezoid that is a truncation of a right triangle.

With further reference to FIG. 3E, in accordance with embodiments of the present invention, the plurality 220 of suspension-lead pads 220a-220f includes an array of suspension-lead pads 220a-220f that are configured with shapes in a plane in which the suspension-lead pads 220a-220f substantially lie, such that a shape of a suspension-lead pad in succession in the array of suspension-lead pads 220a-220f alternates between a shape of a trapezoid and a shape of a rectangle. In accordance with embodiments of the present invention, the plurality 210 of head-slider pads 210a-210f includes an array of head-slider pads 210a-210f that are configured with shapes in a plane in which the head-slider pads 210a-210f substantially lie, such that a shape of a head-slider pad in succession in the array of head-slider pads 210a-210f alternates between a shape of a trapezoid and a shape of a rectangle. As shown in FIG. 3E, in accordance with one embodiment of the present invention, a head-slider pad 210b that is configured with the shape that is trapezoidal couples with a suspension-lead pad 220b that is configured with a shape that is rectangular. Similarly, as shown in FIG. 3E, in accordance with another embodiment of the present invention, a head-slider pad 210a that is configured with the shape that is rectangular couples with a suspension-lead pad 220a that is configured with a shape that is trapezoidal. In accordance with embodiments of the present invention, bridging of the solder to an adjacent suspension-lead pad 220b is inhibited when soldering the suspension-lead pad 220a to a head-slider pad 210a. In accordance with embodiments of the present invention, at least one of the lateral sides 220a-1 and 220a-2 of the suspension-lead pad 220a is configured to inhibit a solder bond, for example, solder bond 230a, from forming a bridge with an adjacent solder bond, for example, solder bond 230b, that is bonded to an adjacent suspension-lead pad 220b.

Figure 3F:
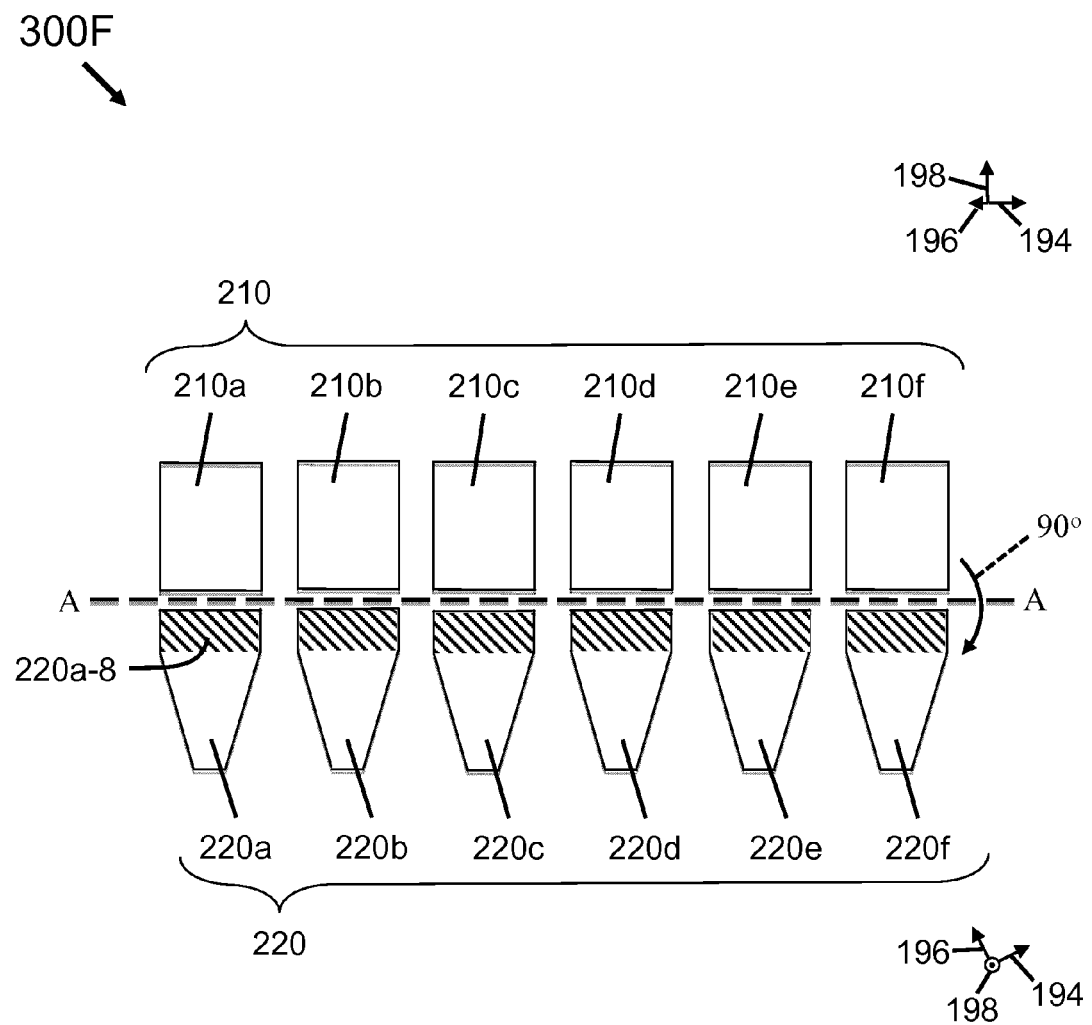
FIG. 3F is a plan view of a sixth example arrangement of the suspension-lead pads and the head-slider pads, oriented similar to FIG. 3A, in accordance with one or more embodiments of the present invention.

With reference now to FIG. 3F, in accordance with embodiments of the present invention, a plan view 300F of a sixth example arrangement of the suspension-lead pads 220a-220f and the head-slider pads 210a-210f, which is oriented similar to FIG. 3A, is shown. In accordance with embodiments of the present invention, a proximal portion of the suspension-lead pad 220a disposed in proximity to a respective head-slider pad 210a is configured with a broadened portion 220a-8. In accordance with embodiments of the present invention, the broadened portion 220a-8 of the suspension-lead pad 220a may be configured to increase the size of the solder bond 230a at the junction between the suspension-lead pad 220a and the head-slider pad 210a, which may improve the mechanical strength of the solder bond 230a. In accordance with embodiments of the present invention, the broadened portion 220a-8 of the suspension-lead pad 220a may have a substantially rectangular shape, as shown in FIG. 3F, without limitation thereto.

Figure 3G:
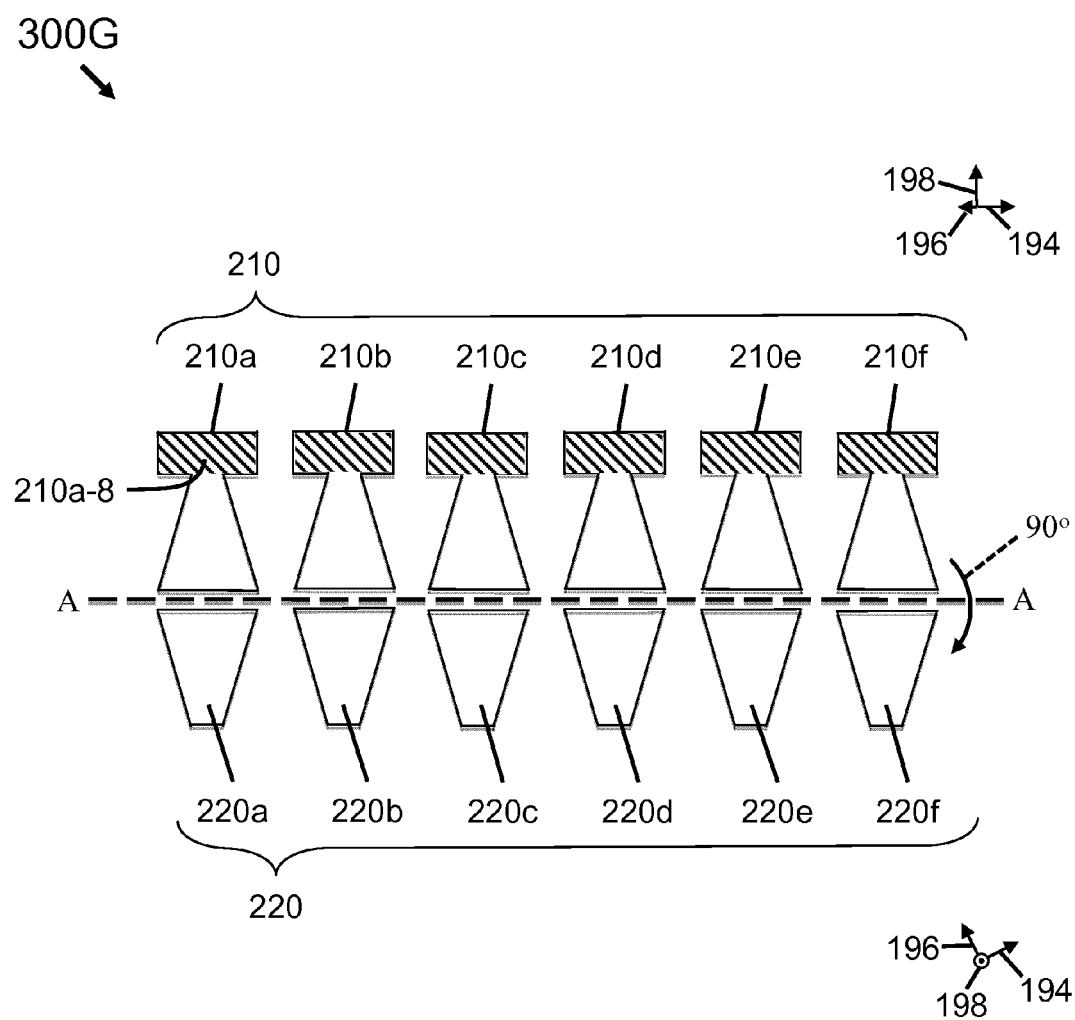
FIG. 3G is a plan view of a seventh example arrangement of the suspension-lead pads and the head-slider pads, oriented similar to FIG. 3A, in accordance with one or more embodiments of the present invention.

With reference now to FIG. 3G, in accordance with embodiments of the present invention, a plan view 300G of a seventh example arrangement of the suspension-lead pads 220a-220f and the head-slider pads 210a-210f, which is oriented similar to FIG. 3A, is shown. In accordance with embodiments of the present invention, a distal portion of a head-slider pad 210a disposed distally from a respective suspension-lead pad 220a is configured with a broadened portion 210a-8. In accordance with embodiments of the present invention, the broadened portion 210a-8 of the head-slider pad 210a may also be configured as a land for a test probe. In accordance with embodiments of the present invention, the broadened portion 210a-8 of the head-slider pad 210a may also have a substantially rectangular shape, as shown in FIG. 3G, without limitation thereto.

Figure 3H:
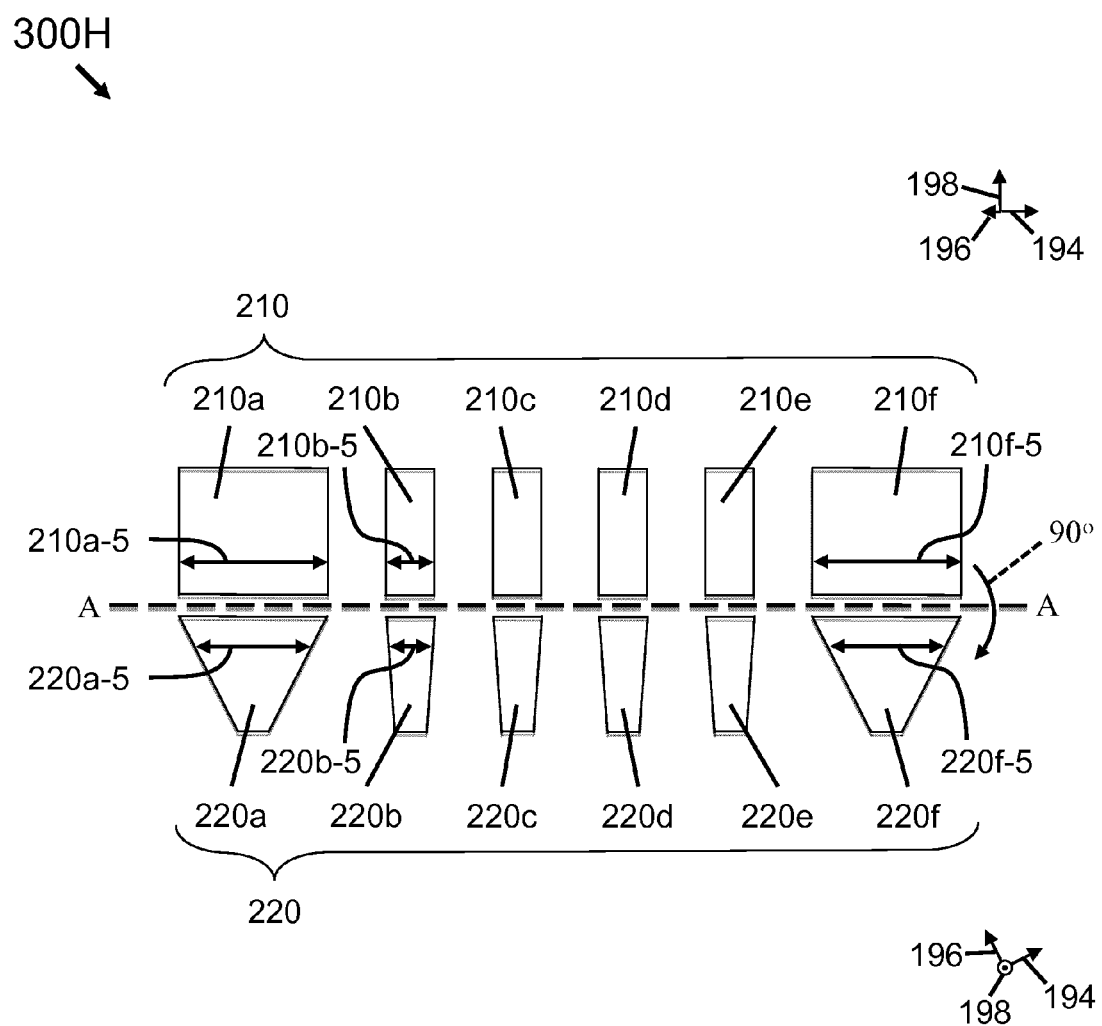
FIG. 3H is a plan view of an eighth example arrangement of the suspension-lead pads and the head-slider pads, oriented similar to FIG. 3A, in accordance with one or more embodiments of the present invention.

With reference now to FIG. 3H, in accordance with embodiments of the present invention, a plan view 300H of an eighth example arrangement of the suspension-lead pads 220a-220f and the head-slider pads 210a-210f, which is oriented similar to FIG. 3A, is shown. In accordance with embodiments of the present invention, widths of an end pair of pads, for example, widths 210a-5 and 220a-5 of head-slider pad 210a and respective suspension-lead pad 220a, or alternatively, widths 210f-5 and 220f-5 of head-slider pad 210f and respective suspension-lead pad 220f, which include a respective head-slider pad and a respective suspension-lead pad disposed at an end of an array of respective head-slider pads 210a-210f and respective suspension-lead pads 220a-220f, are configured with greater widths, per the example, widths 210a-5 and 220a-5, or alternatively, widths 210f-5 and 220f-5, than corresponding widths of a pair of pads, for example, widths 210b-5 and 220b-5 of head-slider pad 210b and respective suspension-lead pad 220b, which include a head-slider pad and a respective suspension-lead pad not disposed at an end of the array of respective head-slider pads 210a-210f and respective suspension-lead pads 220a-220f. In accordance with embodiments of the present invention, the end pair of pads is configured to provide a solder bond, for example, solder bond 230a, or alternatively, solder bond 230f, that is larger than solder bonds, for example, one of solder bonds 230b-230e, not disposed at an end of the array of respective head-slider pads 210a-210f and respective suspension-lead pads 220a-220f. In accordance with embodiments of the present invention, the end pair of pads is configured to provide a solder bond, for example, solder bond 230a, or alternatively, solder bond 230f, more resistant to deformation, or alternatively, fracture, due to applied stress than solder bonds, for example, one of solder bonds 230b-230e, not disposed at an end of the array of respective head-slider pads 210a-210f and respective suspension-lead pads 220a-220f. In accordance with embodiments of the present invention, an end head-slider pad, for example, head-slider pad 210a, or alternatively, head-slider pad 210f, disposed at an end of an array of respective head-slider pads 210a-210f is configured with a greater width, for example, width 210a-5, or alternatively, width 210f-5, respectively, than a corresponding width, for example, width 220b-5, of a head-slider pad, for example, one of head-slider pads 210b-210e, not disposed at an end of the array of head-slider pads 210a-210f.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A head-gimbal assembly (HGA) with a suspension-lead pad having a form that is configured to inhibit formation of an inter-pad solder bridge, said HGA comprising:
   a gimbal;
   a head-slider coupled with said gimbal, said head-slider comprising a plurality of head-slider pads; and
   a plurality of suspension-lead pads coupled respectively with said plurality of head-slider pads by a plurality of respective solder bonds, a suspension-lead pad of said plurality of suspension-lead pads comprising a first lateral side, a second lateral side, a proximal side, disposed in proximity to a respective head-slider pad, and a distal side, disposed distally from said respective head-slider pad;
   wherein a first width of said suspension-lead pad closer to said proximal side is substantially larger than a second width of said suspension-lead pad further from said proximal side than said first width, wherein a second suspension-lead pad of said plurality of suspension-lead pads comprises a first lateral side of said second suspension-lead pad, and a second lateral side of said second suspension-lead pad; and
   wherein said first lateral side and said second lateral side of said second suspension-lead pad lie substantially along respective straight-line segments, and a straight-line segment corresponding to said first lateral side of said second suspension-lead pad is substantially parallel to a straight-line segment corresponding to said second lateral side of said second suspension-lead pad.

2. The HGA of claim 1, wherein said first lateral side and said second lateral side of said suspension-lead pad lie substantially along respective straight-line segments, and a straight-line segment corresponding to said first lateral side of said suspension-lead pad is not parallel to a straight-line segment corresponding to said second lateral side of said suspension-lead pad.

3. The HGA of claim 1, wherein a proximal inter-pad distance defined between said second lateral side of said suspension-lead pad and an adjacent first lateral side of an adjacent suspension-lead pad at said proximal side of said suspension-lead pad is substantially less than a distal inter-pad distance defined between said second lateral side of said suspension-lead pad and said adjacent first lateral side of said adjacent suspension-lead pad at said distal side of said suspension-lead pad.

4. The HGA of claim 1, wherein a head-slider pad of said plurality of head-slider pads comprises a first lateral side of said head-slider pad, and a second lateral side of said head-slider pad; and
   wherein said first lateral side and said second lateral side of said head-slider pad lie substantially along respective straight-line segments, and a straight-line segment corresponding to said first lateral side of said head-slider pad is not parallel to a straight-line segment corresponding to said second lateral side of said head-slider pad.

5. The HGA of claim 1, wherein said second suspension-lead pad of said plurality of suspension-lead pads is configured with a shape in a plane in which said second suspension-lead pad substantially lies that is substantially rectangular.

6. The HGA of claim 1, wherein said plurality of suspension-lead pads comprises a fan-out structure, wherein proximal sides of said plurality of suspension-lead pads disposed in proximity to said plurality of respective head-slider pads are spaced closer together than distal sides of said plurality of suspension-lead pads disposed distally from said plurality of respective head-slider pads.

7. The HGA of claim 1, wherein a width of a proximal side of a head-slider pad disposed in proximity to a respective suspension-lead pad is larger than a width of a distal side of said head-slider pad disposed distally from said respective suspension-lead pad.

8. The HGA of claim 1, wherein said suspension-lead pad is configured with a shape in a plane in which said suspension-lead pad substantially lies that is selected from shapes of figures of the group consisting of a trapezoid, an isosceles trapezoid, and a trapezoid that is a truncation of a right triangle.

9. The HGA of claim 1, wherein a head-slider pad is configured with a shape in a plane in which said head-slider pad substantially lies that is selected from shapes of figures of the group consisting of a rectangle, a trapezoid, an isosceles trapezoid, and a trapezoid that is a truncation of a right triangle.

10. The HGA of claim 1, wherein a distal portion of a head-slider pad disposed distally from a respective suspension-lead pad is configured with a broadened portion.

11. The HGA of claim 1, wherein a proximal portion of said suspension-lead pad disposed in proximity to a respective head-slider pad is configured with a broadened portion.

12. The HGA of claim 1, wherein widths of an end pair of pads comprising a respective head-slider pad and a respective suspension-lead pad disposed at an end of an array of respective head-slider pads and respective suspension-lead pads are configured with greater widths than corresponding widths of a pair of pads comprising a head-slider pad and a respective suspension-lead pad not disposed at an end of said array of respective head-slider pads and respective suspension-lead pads.

13. A head-slider with a head-slider pad having a form that is configured to inhibit formation of an inter-pad solder bridge, said head-slider comprising:
   a slider;
   a magnetic-recording head coupled with said slider, said magnetic-recording head comprising:
      a write element configured for writing data to a magnetic-recording disk;
      a read element configured for reading data from said magnetic-recording disk; and
   a plurality of head-slider pads, a head-slider pad of said plurality of head-slider pads comprising a first lateral side, a second lateral side, a proximal side, configured for being disposed in proximity to a respective suspension-lead pad, and a distal side, configured for being disposed distally from said respective suspension-lead pad;
   wherein a first width of said head-slider pad closer to said proximal side is substantially wider than a second width of said head-slider pad towards said proximal side than said first width and includes a broadened portion more distal than said second narrower width of said head slider portion, wherein a distal portion of said head-slider pad configured for being disposed distally from said respective suspension-lead pad is configured with a broadened portion.

14. The head-slider of claim 13, wherein said first lateral side and said second lateral side of said head-slider pad lie substantially along respective straight-line segments, and a straight-line segment corresponding to said first lateral side is not parallel to a straight-line segment corresponding to said second lateral side.

15. The head-slider of claim 13, wherein a proximal inter-pad distance defined between said second lateral side of said head-slider pad and an adjacent first lateral side of an adjacent head-slider pad at said proximal side of said head-slider pad is substantially less than a distal inter-pad distance between said second lateral side of said head-slider pad and said adjacent first lateral side of said adjacent head-slider pad at said distal side of said head-slider pad.

16. The head-slider of claim 13, wherein said head-slider pad is configured with a shape in a plane in which said head-slider pad substantially lies that is selected from shapes of figures of the group consisting of a trapezoid, an isosceles trapezoid, and a trapezoid that is a truncation of a right triangle.

17. The head-slider of claim 13, wherein an end head-slider pad disposed at an end of an array of respective head-slider pads is configured with a greater width than a corresponding width of a head-slider pad not disposed at an end of said array of head-slider pads.

18. A hard-disk drive (HDD) including a HGA with a suspension-lead pad having a form that is configured to inhibit formation of an inter-pad solder bridge, said HDD comprising:
 a magnetic-recording disk;
 a disk enclosure comprising a disk-enclosure base;
 a spindle motor affixed in said disk-enclosure base, for rotating said magnetic-recording disk;
 an actuator arm; and
 a HGA attached to said actuator arm, said HGA comprising:
  a gimbal;
  a head-slider coupled with said gimbal, comprising:
   a slider;
   a magnetic-recording head coupled with said slider, said magnetic-recording head comprising:
    a write element configured to write data to said magnetic-recording disk;
    a read element configured to read data from said magnetic-recording disk; and
   a plurality of head-slider pads; and
  a plurality of suspension-lead pads coupled respectively with said plurality of head-slider pads by a plurality of respective solder bonds, a suspension-lead pad of said plurality of suspension-lead pads comprising a first lateral side, a second lateral side, a proximal side, disposed in proximity to a respective head-slider pad, and a distal side, disposed distally from said respective head-slider pad;
  wherein a first width of said suspension-lead pad closer to said proximal side is substantially larger than a second width of said suspension-lead pad further from said proximal side than said first width;
  wherein said HGA is configured to support said head-slider in proximity with a recording surface of said magnetic-recording disk when said magnetic-recording disk is rotated by said spindle motor, and said actuator arm is configured to be pivoted by a voice coil motor for accessing data on said magnetic-recording disk; and
  wherein widths of an end pair of pads comprising a respective head-slider pad and a respective suspension-lead pad disposed at an end of an array of respective head-slider pads and respective suspension-lead pads are configured with greater widths than corresponding widths of a pair of pads comprising a head-slider pad and a respective suspension-lead pad not disposed at an end of said array of respective head-slider pads and respective suspension-lead pads.

19. The HDD of claim 18, wherein a head-slider pad of said plurality of head-slider pads comprises a first lateral side of said head-slider pad, and a second lateral side of said head-slider pad; and
 wherein said first lateral side and said second lateral side of said head-slider pad lie substantially along respective straight-line segments, and a straight-line segment corresponding to said first lateral side of said head-slider pad is not parallel to a straight-line segment corresponding to said second lateral side of said head-slider pad.

20. The HDD of claim 18, wherein a second suspension-lead pad of said plurality of suspension-lead pads comprises a first lateral side of said second suspension-lead pad, and a second lateral side of said second suspension-lead pad; and
 wherein said first lateral side and said second lateral side of said second suspension-lead pad lie substantially along respective straight-line segments, and a straight-line segment corresponding to said first lateral side of said second suspension-lead pad is substantially parallel to a straight-line segment corresponding to said second lateral side of said second suspension-lead pad.

21. The HDD of claim 18, wherein said suspension-lead pad is configured with a shape in a plane in which said suspension-lead pad substantially lies that is selected from shapes of figures of the group consisting of a trapezoid, an isosceles trapezoid, and a trapezoid that is a truncation of a right triangle.

22. The HDD of claim 18, wherein a head-slider pad is configured with a shape in a plane in which said head-slider pad substantially lies that is selected from shapes of figures of the group consisting of a rectangle, a trapezoid, an isosceles trapezoid, and a trapezoid that is a truncation of a right triangle.

* * * * *